Figure 1:
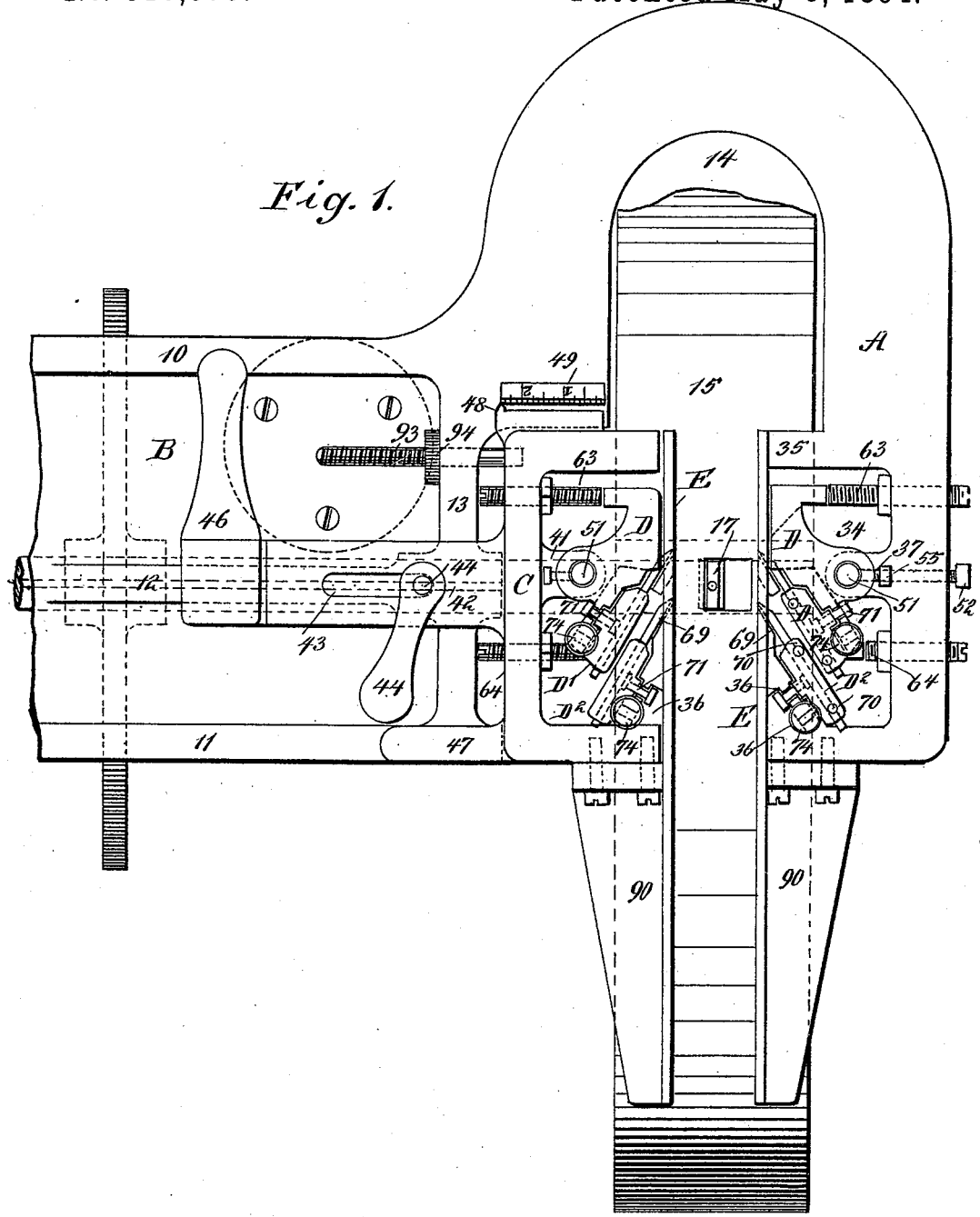

(No Model.) 7 Sheets—Sheet 1.

H. A. DODGE & W. T. RICHARDS.
TRACE CUTTING AND TRIMMING MACHINE.

No. 519,570. Patented May 8, 1894.

WITNESSES:
F. McArdle
C. Sedgwick

INVENTORS
H. A. Dodge
W. T. Richards
BY Munn & Co.
ATTORNEYS.

(No Model.) 7 Sheets—Sheet 2.
H. A. DODGE & W. T. RICHARDS.
TRACE CUTTING AND TRIMMING MACHINE.
No. 519,570. Patented May 8, 1894.
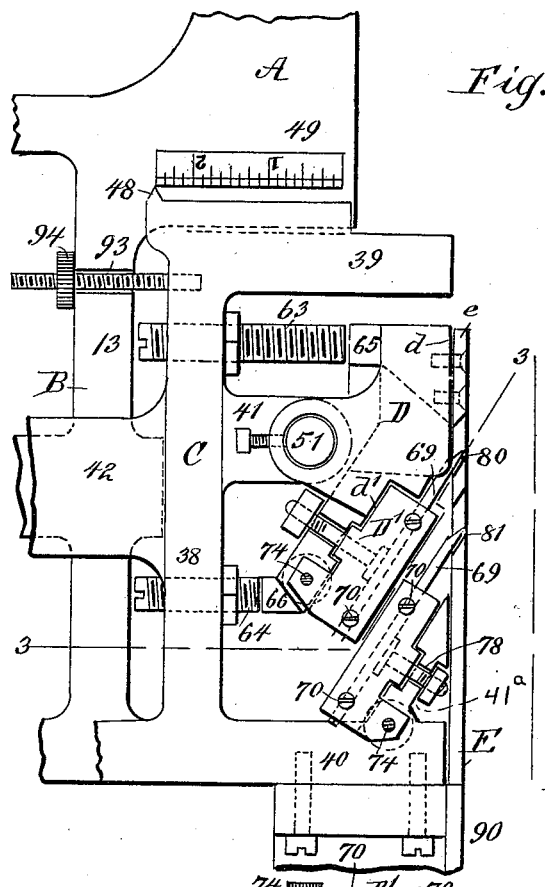
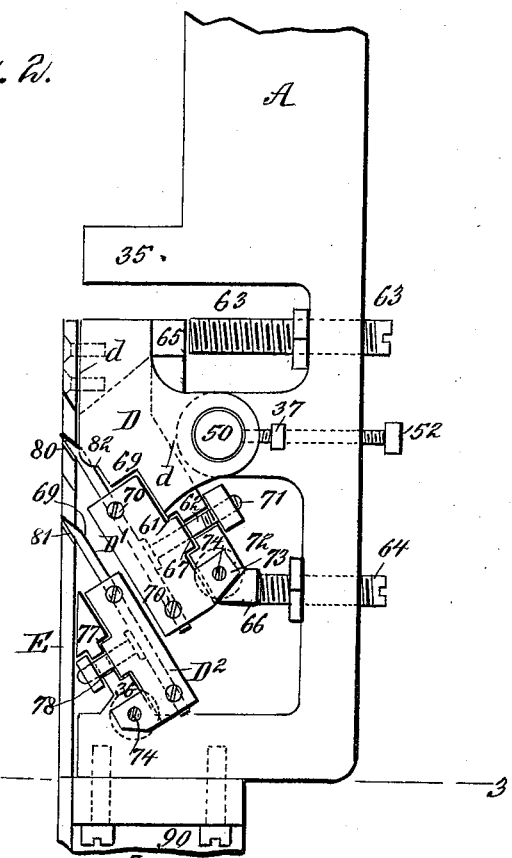
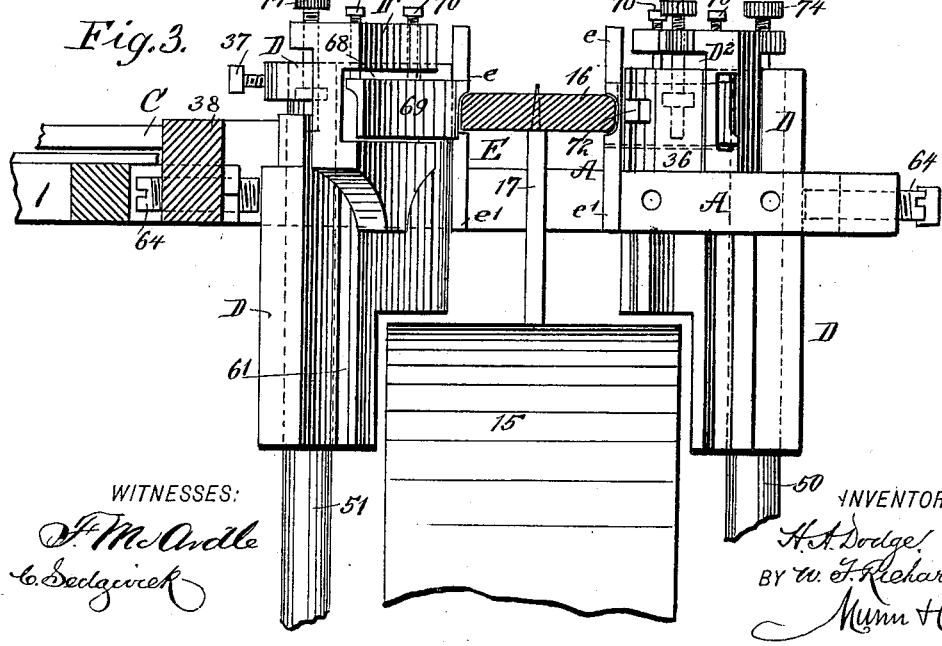
WITNESSES:
F. McArdle
C. Sedgwick
INVENTORS
H. A. Dodge
W. T. Richards
BY Munn & Co.
ATTORNEYS.

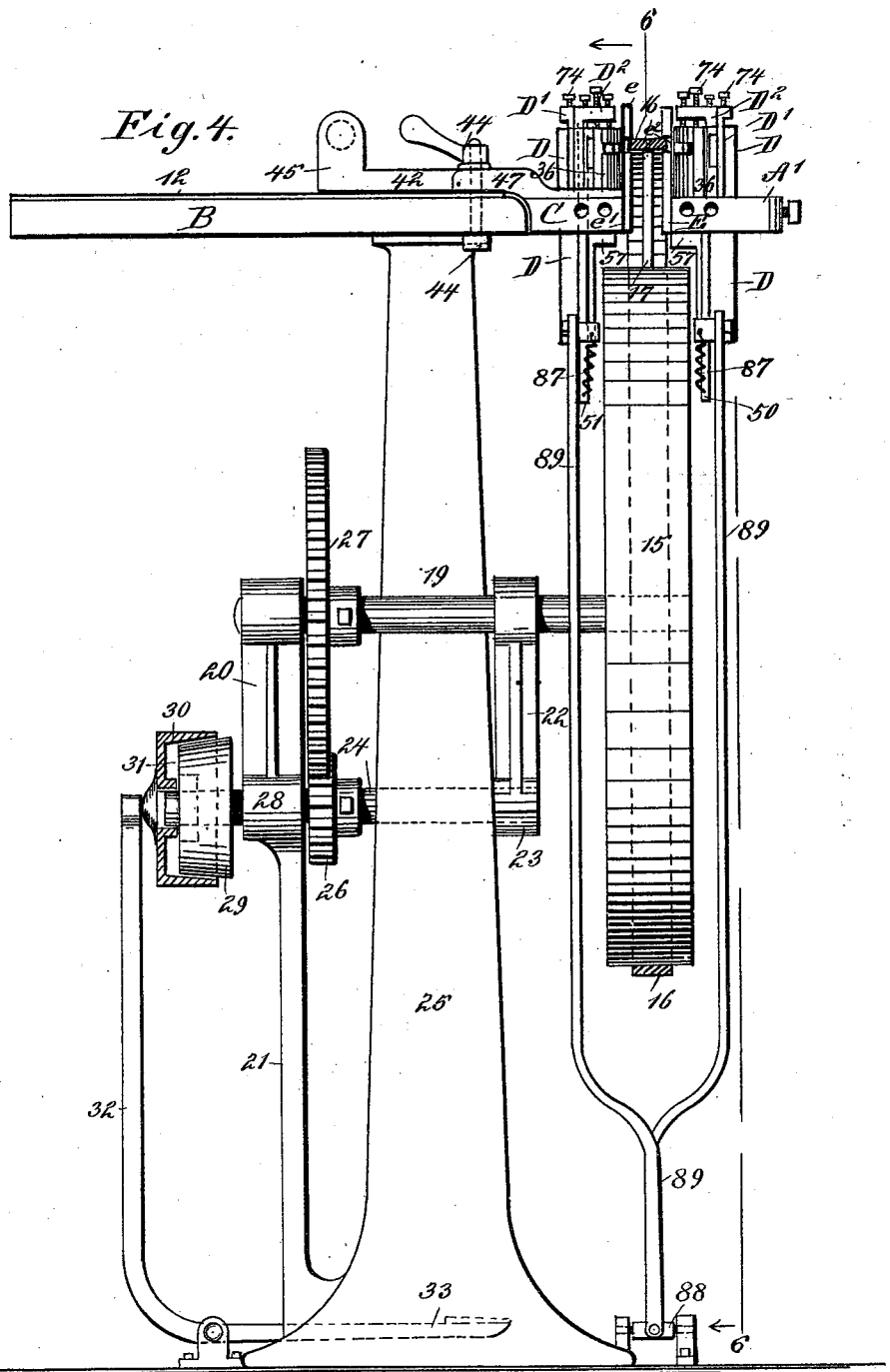

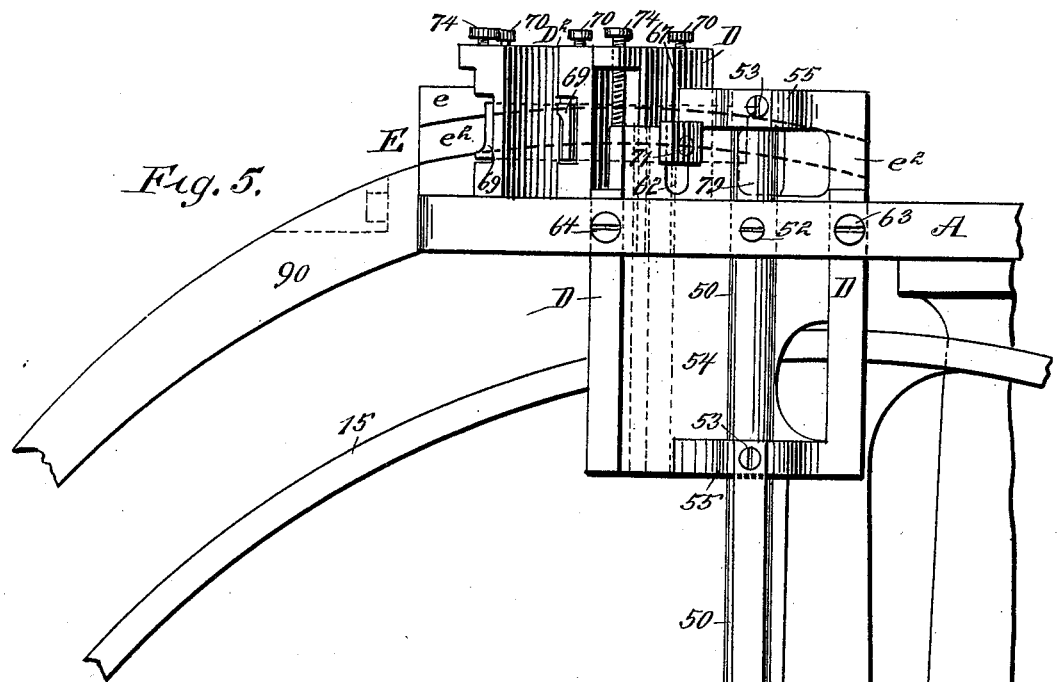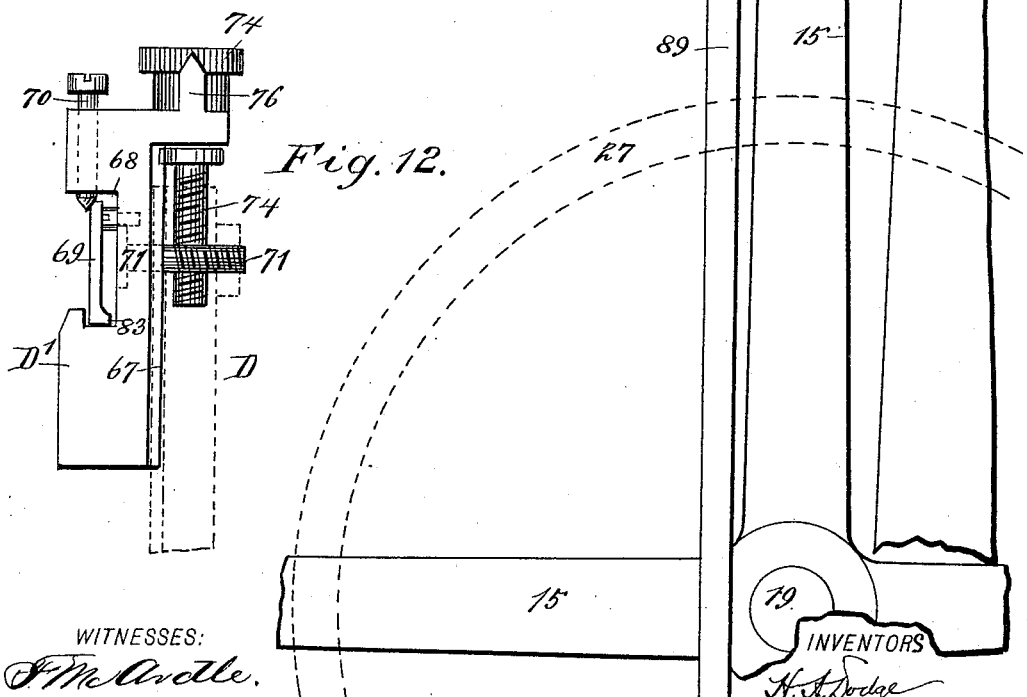

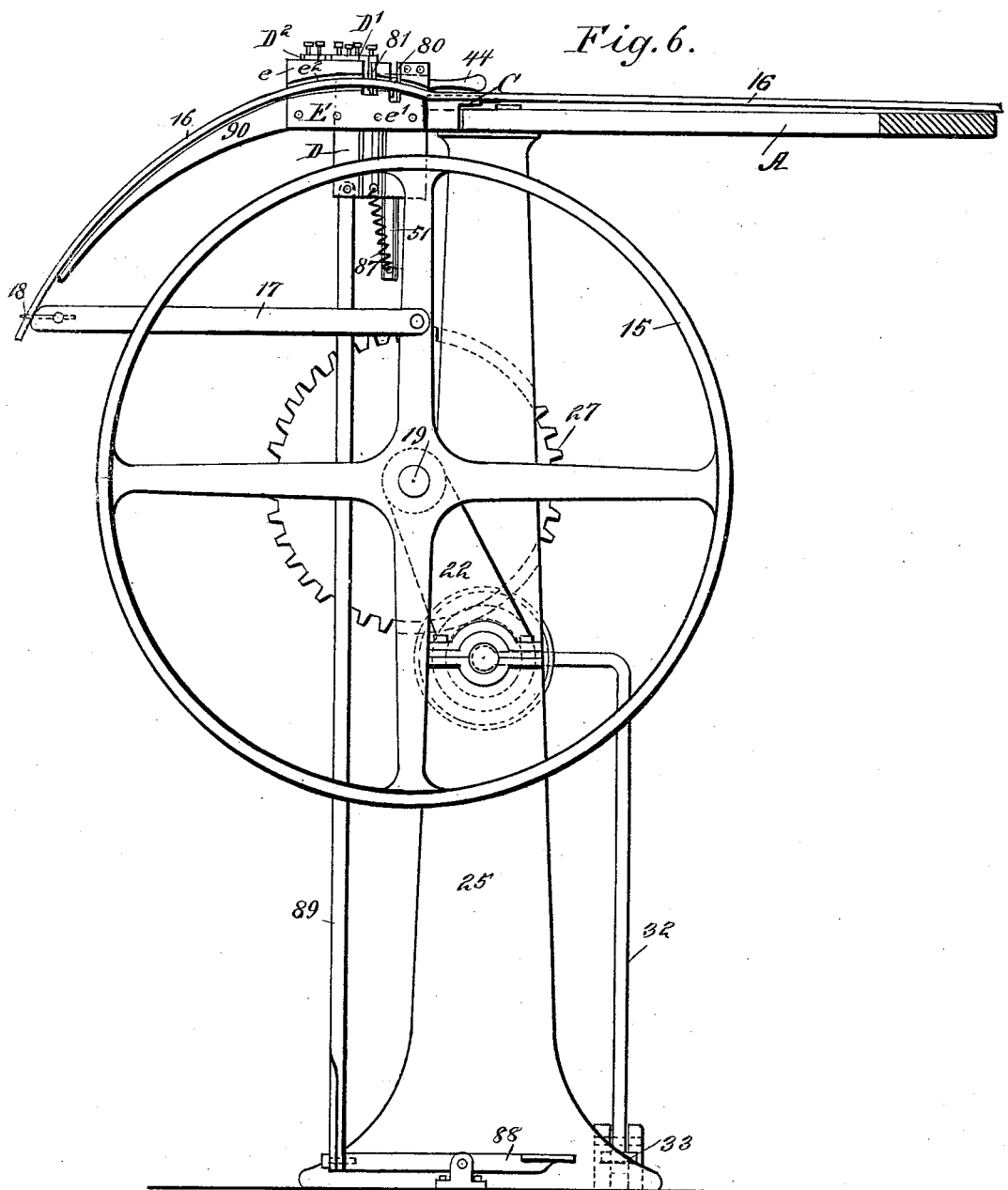

(No Model.) 7 Sheets—Sheet 6.
H. A. DODGE & W. T. RICHARDS.
TRACE CUTTING AND TRIMMING MACHINE.
No. 519,570. Patented May 8, 1894.
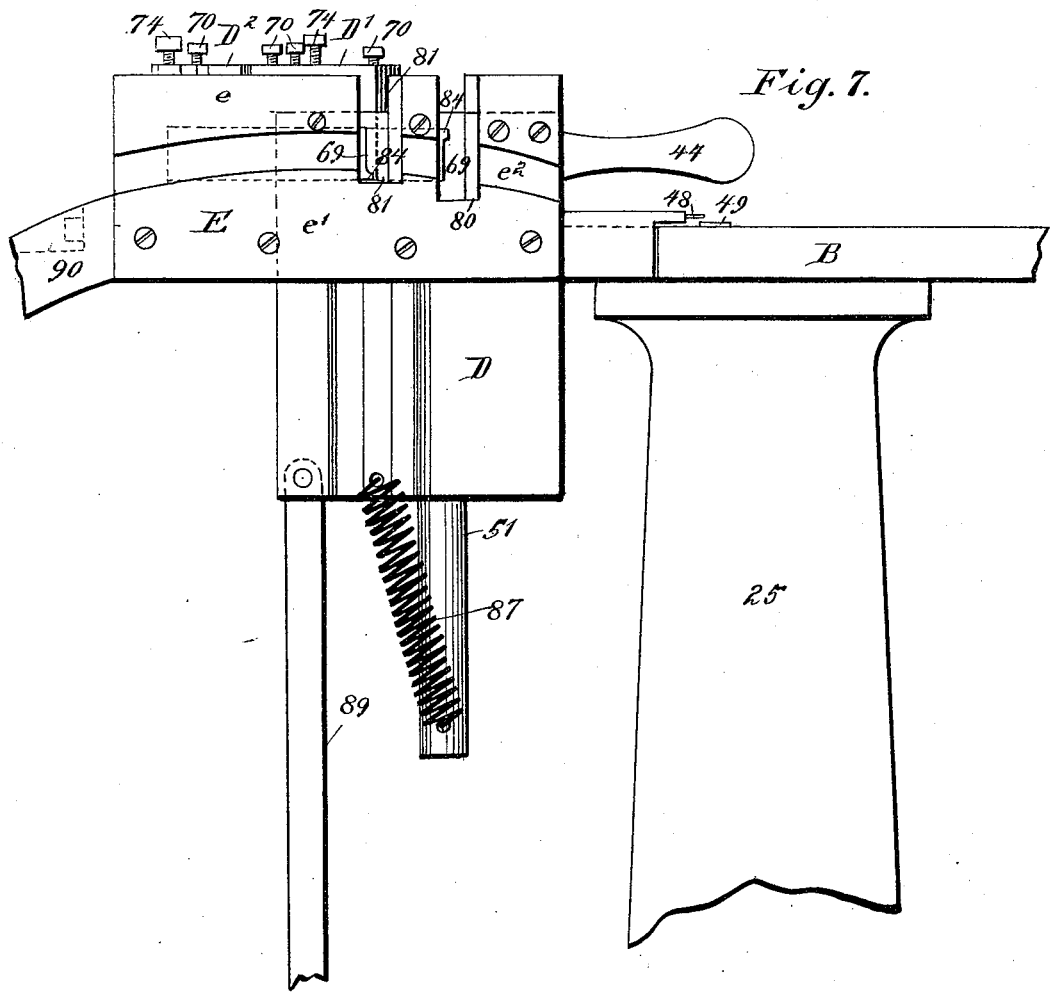
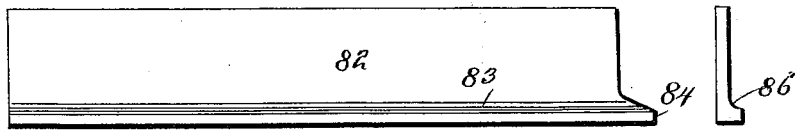
WITNESSES:
INVENTORS
H. A. Dodge
BY W. T. Richards
ATTORNEYS.

(No Model.) 7 Sheets—Sheet 7.
H. A. DODGE & W. T. RICHARDS.
TRACE CUTTING AND TRIMMING MACHINE.
No. 519,570. Patented May 8, 1894.
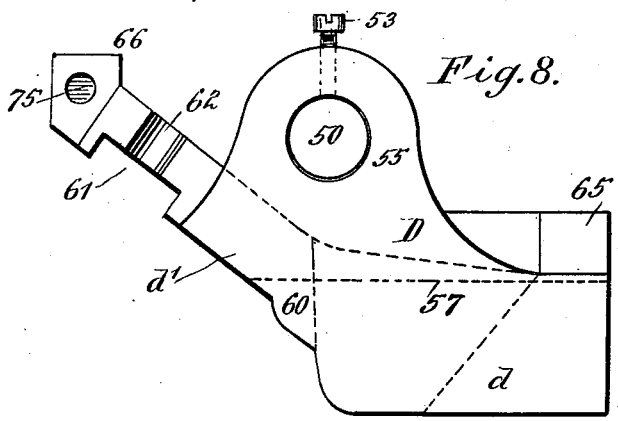
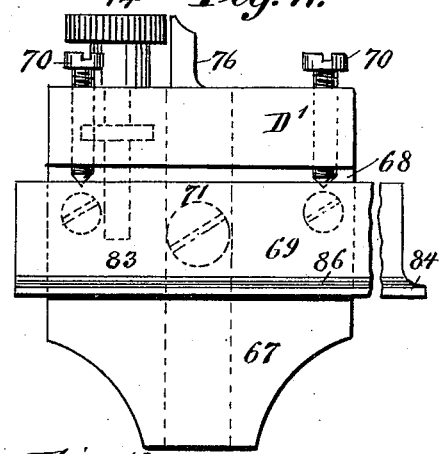
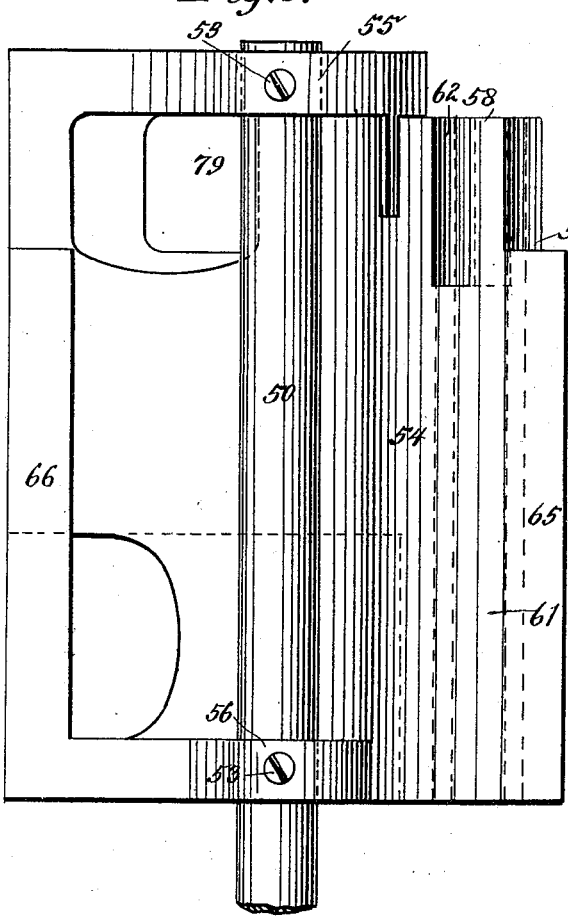
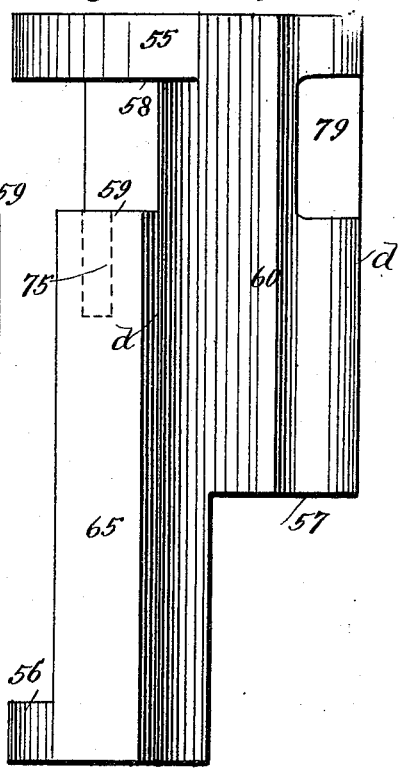
WITNESSES:
INVENTORS
H. A. Dodge
W. T. Richards
BY Munn & Co
ATTORNEYS.

UNITED STATES PATENT OFFICE.

HENRY ALVIN DODGE, OF BOSTON, AND WILLIAM THOMPSON RICHARDS, OF NEWTON, MASSACHUSETTS, ASSIGNORS TO THE BOSWORTH MACHINE COMPANY, OF MILFORD, CONNECTICUT.

TRACE CUTTING AND TRIMMING MACHINE.

SPECIFICATION forming part of Letters Patent No. 519,570, dated May 8, 1894.

Application filed October 31, 1893. Serial No. 489,608. (No model.)

*To all whom it may concern:*

Be it known that we, HENRY ALVIN DODGE, of Boston, in the county of Suffolk, and WILLIAM THOMPSON RICHARDS, of Newton, in the county of Middlesex, State of Massachusetts, have invented a new and Improved Trace Cutting and Trimming Machine, of which the following is a full, clear, and exact description.

Our invention relates to a trace-cutting and trimming machine, and it has for its object to construct a machine capable of adjustment to form traces of any desired width, and in which the knives will be automatically operated upon the leather to simultaneously trim the side faces and round off the upper and lower corners, a trace of perfect construction being formed by simply passing the material through the machine.

A further object of the invention is to provide a carrier for the trace leather or strap from which the trace is to be made, which carrier will be in the nature of a wheel, and will, while in operation, automatically act to regularly and properly feed the strap to the knives.

Another feature of the invention consists in providing a means whereby one knife, or set of knives, at each side of the strap will be mounted in carriages so constructed that the said knives will automatically adjust themselves to any desired thickness of strap.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the machine. Fig. 2 is an enlarged plan view of the knife carrying mechanism, the knives, and the frame or table upon which they are mounted. Fig. 3 is a partial, longitudinal vertical section and a partial transverse vertical section of the machine, the section being taken practically on the line 3—3 of Fig. 2. Fig. 4 is a side view of the machine with the horns removed. Fig. 5 is a partial rear view of the machine. Fig. 6 is a vertical section taken from side to side of the machine through the wider part of its frame, and practically on the line 6—6 of Fig. 4. Fig. 7 is an enlarged detail view of the upper portion of the mechanism shown in Fig. 6, the carrier or conveyer wheel being removed. Fig. 8 is a plan view of an upper knife carriage. Fig. 9 is a rear or outer view of an upper knife carriage, and Fig. 10 is a side elevation of the same. Fig. 11 is a front or inner face view of an upper knife block, adapted to be mounted in the above mentioned carriage. Fig. 12 is a vertical edge view of an upper knife block, a portion of the carriage being shown in dotted lines; and Figs. 13, 14, and 15 are respectively a side elevation, end view and a plan view of one of the lower knives.

This invention is intended to provide a trace trimmer which will cut both sides and round off the four longitudinal corners of the trace, by passing the strap or trace but once through the machine.

The frame of the machine may be said to consist of two horizontal sections, a horseshoe section A and a table section B, the table being projected from the outer side of one member of the horse-shoe section, as is best shown in Fig. 1. The table is usually provided upon its upper face with marginal side ribs 10 and 11, an intermediate longitudinal rib 12 and a transverse rib 13 at the junction of the table and horse-shoe sections. The space 14 between the members of the horse-shoe section of the frame may be termed a passage-way, and immediately beneath this passage-way a carrier or conveyer wheel 15, is located, the said wheel being adapted to pull forward and thereby convey to the knives the strap 16 to be operated upon. This wheel may be provided with any device adapted to hold the strap 16. One means of holding the strap is shown in Fig. 6, and it consists in an arm 17 pivoted or secured to a spoke of the wheel for example, and said arm is made to extend out through the slot or opening produced in the central portion of the periphery of the wheel, and at the outer end of the arm an awl 18, or the equivalent thereof, is secured, which is passed through the strap 16.

The carrier or conveyer wheel is mounted upon a shaft 19, journaled at one end in a bracket arm 20, formed upon a standard 21, the bracket arm being inclined in direction of the right-hand side of the machine, and a second bracket arm 22, is provided as a support for the shaft 19, inclined in similar manner to the bracket arm 20, the bracket arm 22 being attached preferably to a box 23, in which one end of a driving shaft 24 is journaled. The box 23, is secured to a pillar 25, which is the main support for the frame of the machine, the pillar being adapted to be secured to the flooring, or other equivalent support, and the pillar is secured at its top, usually at the left-hand side of the table section of the frame, near where said section joins the horse-shoe section, as shown in Figs. 1 and 4.

The driving shaft 24, is not in vertical alignment with the wheel shaft 19, the wheel shaft 19 being to the right of the drive shaft; and the wheel shaft is driven from the drive shaft by securing upon the latter a pinion 26, which meshes with a gear 27, secured to the wheel shaft. The standard 21 is preferably made a branch of the pillar 25, and the said standard carries at its upper end a box 28, in which the drive shaft is also journaled. One end of the drive shaft is provided with a beveled face pulley 29, which is adapted to be engaged by a driving pulley 30, over which a driving belt is placed the latter pulley being loosely mounted upon the drive shaft, and it is provided with a substantially conical recess 31 in one of its faces, and when the recessed portion of the driving pulley is carried over and in frictional engagement with the periphery of the fixed pulley 29 on the drive shaft the latter pulley will be revolved by frictional contact with the driving pulley, and when the machine is to be stopped it is quickly accomplished by carrying these two pulleys one out of engagement with the other. The shifting of the driving pulley 30, may be accomplished in any suitable manner, usually through the medium of a shifting lever 32, having swivel connection with the driving pulley, and adapted to be operated by the foot through the medium of a treadle 33, as shown best in Fig. 4.

The forward member of the horse-shoe section of the frame is shorter than its rear member, the forward member ordinarily terminating where it connects with the table, as shown in Fig. 1; and in the right-hand end of the longer or rear member of the said horse-shoe section of the frame a recess 34 is made in its inner edge, somewhat of a rectangular character; and the left-hand wall of this recess is projected outward horizontally in the passage way 14, forming practically a lug 35, and a more or less angular rib 36 is formed in like manner at the left-hand or outer end portion of the recess, the lug 36 being beveled upon its inner face, and since it is straight upon the face opposite the passage way and at its right hand end, the lug 36, is substantially triangular. A third lug 37, is formed near the central portion of the recess 34, but the lug 37, is formed upon the inner side wall of the recess and extends only to about the central portion of the recess.

Within the recessed portion 34 of the horse-shoe section of the frame, cutters to be hereinafter described are located, adapted to cut and trim one side surface of the trace and the top and bottom corners at that side. The cutters at the opposite side of the passage way, and those adapted to trim the opposite side and corners of the trace, are located in a shifting or adjustable frame C. This frame comprises a forward bar 38, which is adapted to lie transversely of the main frame and in front of the inner end of the table B, as shown in Fig. 2; and a longitudinal bar 39 is located at the left-hand end of the transverse bar 38, while a second longitudinal bar 40, is secured at the right-hand end of the said transverse bar, and a lug 41 is projected from the inner face of the transverse bar, usually at one side of its center, forming thereby a frame essentially of an E-shape. This frame, as is shown in Fig. 4, is to be adjusted to or from the table, and to that end it is provided with an arm 42, projected forwardly over the table, from the forward bar 38 of the body of the frame. The arm 42, is provided in its under face with a groove to receive the intermediate rib 12 upon the table, and the frame is held in adjusted position by producing a slot 43 in the said arm, and locating in the table rib 12 a set screw 44, extending upward through the slot, as shown best in Fig. 1. The arm is usually provided with an upwardly-extending lug 45 at its forward end, shown in Fig. 4, which lug is adapted to carry a handle 46, to facilitate the manipulation of the sliding frame.

The sliding frame is provided at its right-hand end with an extension 47, which has sliding movement upon the right-hand rib 11 of the table, as shown in Figs. 1 and 4, and the left-hand end of the frame is supported by sliding upon the forward member of the horse-shoe section of the frame, and this portion of the sliding frame usually carries an index finger 48, which travels over a scale 49, made upon the horse-shoe section of the frame, the scale being usually in inches, and it is adapted to indicate the width of the trace to be operated upon.

A guide rod is passed upward through the lug 37 at the rear side of the passage-way 14, and a similar rod is passed upward through the lug 41 in the sliding frame. These rods are designated respectively as 50 and 51, and they are adjustably located in their frames through the medium of set screws 52, passed through the outer portions of the frame and to an engagement with the rods. The guide rods extend upward above their frames and downward some distance below them, being carried a much greater distance below than above the frame, as shown in Fig. 5, in which figure the left-hand rod is shown in elevation. These rods are adapted as guides for the carriages D, adapted as carriers for the upper knives, as these knives are automatically adjustable, and to that end the carriages D are adapted to have sliding movement on the said rods 50 and 51. The triangular lug 36, located upon the horse-shoe section of the frame, stands vertically some distance above the upper face of the frame, as shown in Fig. 3, and a like lug 41ª is formed correspondingly upon the sliding frame C, the lug projecting from the right-hand bar 40 of the said frame.

The knife carriages D, are more or less angular in plan view, as shown in Figs. 2 and 8, and they stand perpendicularly in their frames; one perpendicular surface or member $d$, is parallel with a straight line drawn longitudinally through the passage-way 14, while the other perpendicular surface or member $d'$, is at an acute angle to such a line, as illustrated in Fig. 2; therefore, the surface or member $d$ may be termed straight and the member $d'$ diagonal.

The backs of the carriages D are cored, as shown at 54 in Figs. 5 and 9, and preferably at a point upon the back of the carriages at which their two members meet, a top and bottom horizontal lug is formed, designated respectively as 55 and 56. These lugs are apertured to receive the guide rods 50 and 51 heretofore referred to, one of the rods being used in connection with each carriage in the machine. The said rods 50 and 51 are round, and the set screws 53, are passed through the lugs to a contact with the guide rods, so that the carriages may be locked to said rods when for example the position to which the carriages have been adjusted is to be maintained for a predetermined time. The carriages extend both above and below the frames in which they are located, as shown in Figs. 5 and 7; and since the carriages are to have automatic vertical movement, one at each side of the carrier or conveyer wheel 15, the lower portions of their straight members $d$, are recessed upon their inner faces, forming a horizontal shoulder 57, as shown in Figs. 4 and 10, whereby the upper portion of the said members are thicker than the lower portions and extend over the periphery of the carrier wheel, yet not in contact with it, while the lower or thinner portions are at the sides of the wheel and removed therefrom.

In plan view the diagonal members of the knife carriages are provided with two stepped surfaces 58 and 59, below the plane of the true upper face, as shown in Figs. 9 and 10; and the front surface of the said members is provided with a vertical guide shoulder 60, extending to the lower or transverse shoulder 57, the vertical member being located adjacent to the junction of the two members, or at an angle to the carriages. The diagonal member $d'$, of each knife carriage is also provided with a vertical groove 61, in or about the center of its front face, and a vertical slot 62 in the upper edge, connecting with the said groove. The carriages are guided in their vertical movement by means of guide screws 63 and 64, which are projected from the outer side portions of the frames in which the carriages are located, as shown in Figs. 1, 2 and 3, the said guide screws having bearing against the straight surfaces prepared upon the back of the carriages, one surface at each end, the bearing surface for the guide screws upon the straight members of the carriages being designated as 65, while the bearing surfaces of the diagonal members $d'$, are designated as 66, and are shown in detail in Figs. 8 and 9.

Each carriage D, is adapted to carry a knife block D', which blocks are shown in detail in Figs. 11 and 12. The knife blocks are adapted to slide vertically and have adjusted movement upon the front faces of the diagonal members of the carriages D. Each knife block is provided with a rib 67, formed upon its rear face, adapted to slide in the groove 61 in the said diagonal members of the carriages, as illustrated in Fig. 2; and in the front face of each knife block a transverse channel 68, is produced, in which a knife 69, is to be placed, and set screws 70, are placed in the upper face of each knife block, and said screws extend down into the knife slots or channels 68, being preferably provided with tapering or conical lower ends to bear against the outer face of the knife located in the block, as shown in Figs. 11 and 12. In order that the knife blocks may be held securely in any position in which they may be adjusted in their carriages, a set screw 71, is secured in each block, which extends out through the rib 67 in the back of the block, and the said screw is made to enter the vertical slot 62 in the diagonal member of its carriage, and the screw is of sufficient length to extend beyond the back of the carriage, where it is provided with a suitable nut 72, as shown in Figs. 2 and 12. Ordinarily the head of the set screw 71 is countersunk in the vertical wall of the knife slot or channel 68.

The vertical adjustment of the knife block D', is effected by locating in a lug 73, projected over the back of the block at one end an adjusting screw 74, which adjusting screw is made to enter an aperture 75, made in the upper surface of the carriage in which the block is located, at one end of the latter, as illustrated in Fig. 2, the aperture being shown in Fig. 8, and the wall of the said aperture is threaded to take the adjusting screw. Each knife block stands diagonally with respect to a center line drawn through the center of the passage way. The blocks D', are usually provided also with a gage post 76, from which it may be determined to what extent the knife is above or below a predetermined level.

It will be understood that the carriages D and the knife blocks they contain, are alike at both sides of the passage-way, but one is mounted in the adjustable frame while the other is located in the fixed frame; and one carriage may be carried to or from the other by the adjustment of the said adjustable frame C, according to the width of the trace to be operated upon. The knives that are located in the carriage knife blocks D', are adapted, in addition to cutting the side faces of the trace, to also automatically shave or round off the upper corners thereof. The knives that are to assist in cutting or shaving the side faces, and are to act positively in rounding off the lower corners, are located in knife blocks $D^2$, which are alike in construction to the blocks located in the carriage.

It will be observed that the carriage blocks are movable through the medium of their carriages, and are likewise movable through the medium of their under adjusting devices; but the blocks for the lower knives are adjustable only through the medium of their under adjusting devices, being connected with fixed supports, and these supports are the lugs or posts 36 and $41^a$, the lug or post 36 being located upon the fixed frame, and the lug or post $41^a$ upon the adjustable frame. The lugs 36 and $41^a$, are therefore provided upon their outer faces with slide ways 77, as shown in Fig. 2, to receive the ribs 67 of the blocks, and with slots 78, which receive the adjusting screws 62 of the blocks. The faces of the knife blocks $D^2$, adapted to carry the lower knives, are made to face the corresponding surfaces of the carriage blocks in which the upper shaving knives are located, or the knives adapted to round off the upper corners of the trace. The vertical adjustment of the blocks $D^2$, carrying the lower shaving knives, is effected by the same mechanism as that heretofore described with relation to the carriage blocks, but the adjusting screws of the blocks $D^2$ are made to enter properly prepared apertures in the lugs or posts 36 and $41^a$. It may here be remarked that openings 79, are made in the carriages, shown best in Figs. 9 and 10, and through these openings the chips of leather are adapted to escape.

It is necessary that some guide should be provided to receive the trace being acted upon, and furthermore that the guide should be automatically adjustable in order that it may regulate itself as may be demanded by the varying thickness of the trace. This guide is in the shape of two channeled plates E. Each plate is made in two sections, an upper section e, and a lower section e'. The lower sections are secured one to the sliding frame and the other to that portion of the fixed frame which extends into the passage way opposite the sliding frame, the attachment being effected through the medium of screws, bolts, or other equivalent fastening devices. The upper sections e, are secured rigidly to the front faces of the straight members d of the carriages D, as shown in Figs. 2 and 7.

A space $e^2$ is made to intervene the opposing edges of the sections of each channeled plate, forming thereby channels or guide-ways into which the side portions of the trace to be operated upon is made to enter, and the channel or space $e^2$ is segmental, the under edge of the upper section of each plate being concaved, while the upper edge of each plate section is convexed, as best shown in Fig. 7. Each channeled plate is preferably provided with two openings 80 and 81, produced vertically therein, the side walls of the openings being inclined or beveled, so that they stand at an acute angle to a center line through the passage way, and these openings 80 and 81, are produced in both the upper and the lower sections of the plates in such manner that if the two sections were brought together each slot 80 and 81 in each section would register. The slots 80 and 81, are adapted to receive the cutting edges of the knives 69; therefore, in the general arrangement of the machine the knives enter the guide ways for the traces at an acute angle, and the knives face in direction of the receiving end of the guide ways. The knives are of peculiar construction, and are shown in detail in Figs. 13, 14 and 15, in which it will be observed that each knife consists of a continuous blade 82 of equal thickness with the exception of one side edge, which is thickened by a rib 83, produced upon one face, which is the outer face of the knife. This rib extends beyond the cutting end of the knife, forming a heel 84, and the knife is beveled upon its back at its cutting edge, as shown at 85 in Fig. 15, in order that it may be placed upon a grindstone and sharpened without difficulty even by a novice in the business. While the edge of the knife upon which the rib is formed may be straight, as shown in Fig. 14, the outer face of the rib, especially where it meets the side of the knife body, is decidedly curved or concaved, as shown at 86 in Fig. 14. Thus the heel 84 of the knife is given somewhat of an outer cylindrical shape, curving inward where it meets the body. The heel of the knife is adapted for rounding off or shaping the corners of the trace, while the cutting edge of the body of the blade is adapted for shaving, cutting or trimming the side surfaces of the trace; and in setting the knives in their box the heels of the knives adapted to shave off the under corners of the trace are at the lower portion of the blade, while those that are adapted to shave off the upper corners of the trace are located at the upper portion of the blade. The two sections of the channeled or guide plates E have automatic vertical movement through the medium of springs 87, which are secured to the lower ends of the knife carriages D and to the lower portion of the guide rods 50 and 51 of said carriages, as shown in Fig. 7. When the upper section of the guide or channeled plate E, is carried upward from the lower section to increase the space between the two sections, the springs 87, are placed under tension; and when, for example, the leather has been entered into the channels or guide-ways $e^2$ of the channeled or guide plates, the upper section having been thrown upward, when the carriages are released from the action of the mechanism applied to force them upward to accomplish this result, the springs 87, will act to draw the upper sections of the channeled plates to an engagement with the trace, thus insuring its proper passage by the cutting edges of the knives, and the springs 87 will yield to accommodate any irregularities in the matter of thickness that may occur in the trace. The carriages are forced upward to increase or decrease the width of the guideways $e^2$, through the medium of a foot lever 88, fulcrumed preferably at the base of the supporting pillar 25, as shown in Figs. 4 and 6, which lever is connected by a bifurcated link 89, with the carriages at each side of the passage-way, as is particularly shown in Fig. 4.

In the operation of this machine, the trace having been passed through the guide-way $e^2$, and attached at one end to the clutch arm 17 of the carrier or conveyer wheel, and the knives having been properly adjusted, upon starting the machine the clutch arm will pull the trace through the guide-way $e^2$, to be simultaneously acted upon by both sets of knives, one set, for example, shaving the right-hand side surface of the trace and shaping the top and bottom corners at that side, while the other set performs the same operation upon the left-hand side of the trace. Thus as the trace leaves the machine it is perfectly shaped, being trimmed at its sides and rounded at its corners. The finished trace is continuously wound on the wheel, 15.

It is desirable that the guide should be provided for the trace for some distance beyond the exit end of the guide channels $e^2$, and to that end guide horns 90, are secured to the frame at each side of the exit end of the passage-way 14. It is evident that as the upper knives are mounted upon the carriages, and the carriages have spring-controlled sliding movement, when the channel or guide-way $e^2$, is automatically widened, the upper set of knives will be carried upward a corresponding distance, so that the heels of these knives will likewise act upon the upper corners of the trace.

This machine is exceedingly simple, it is durable and economic, and it is capable of trimming and shaping traces in an exceedingly expeditious manner. With reference to the conveyer or carrying wheel, the said wheel may be in the form of a drum, and as it is adapted for feeding material to the knives it will be hereinafter claimed as a feeding wheel or drum. The said feeding wheel or drum should preferably be of greater diameter than one-third the length of the material to be carried.

In adjusting the sliding frame C, its adjustment may be limited through the medium of a screw 93, held to travel in a suitable groove or aperture in the inner rib 13 of the table B, as shown in Fig. 2, the screw being secured at one end in the sliding frame, while its opposite end is provided with a thumb nut 94; and according to the adjustment of the thumb nut the sliding frame may be moved to a greater or less extent to or from the opposing fixed knife-carrying frame, and provides means for returning the sliding frame to any predetermined position.

Having thus described our invention, we claim as new and desire to secure by Letters Patent—

1. In a machine for shaving and trimming traces and like articles, a revolving drum or wheel adapted to carry the trace and feed the same to the knives, and means, substantially as shown and described, for holding one end of the trace out of engagement with the periphery of the drum or wheel, as and for the purpose set forth.

2. In a machine for shaving and trimming traces and like articles, the combination, with guides to receive a trace, and knives adapted to operate automatically upon the trace, of a drum or wheel held to rotate below the guides, said drum or wheel having an arm extending from or through the periphery of said drum, and provided with a suitable fastening device to receive the end of the trace, whereby as the drum is revolved the arm will direct the trace through the guide ways, substantially as and for the purpose specified.

3. The combination, with the rotating arm adapted to pull the trace forward, of longitudinally curved guides adapted to receive the trace, substantially as described.

4. The combination with the rotary arm adapted to pull the trace forward, of a longitudinally curved channel adapted to receive the trace, knives projecting into the channel, and curved segmental guides or horns located in the continuation of the said channel, substantially as described.

5. The combination, with the spring-pressed vertically movable guides, and the carriages having sliding movement on the guides so as to be vertically adjustable thereon, of knife blocks that are vertically adjustable relatively to the said carriages, said blocks being constructed to carry knives, substantially as described.

HENRY ALVIN DODGE.
WILLIAM THOMPSON RICHARDS.

Witnesses:
WM. JNO. LEYLAND,
H. STORER BARRY.